US009268880B2

(12) United States Patent
Collins et al.

(10) Patent No.: US 9,268,880 B2
(45) Date of Patent: Feb. 23, 2016

(54) USING RECENT MEDIA CONSUMPTION TO SELECT QUERY SUGGESTIONS

(71) Applicant: Google Inc., Mountain View, CA (US)

(72) Inventors: Alexander Collins, Vallejo, CA (US); Denis Sosnovtsev, New York, NY (US)

(73) Assignee: GOOGLE INC., Mountain View, CA (US)

( * ) Notice: Subject to any disclaimer, the term of this patent is extended or adjusted under 35 U.S.C. 154(b) by 295 days.

(21) Appl. No.: 13/829,616

(22) Filed: Mar. 14, 2013

(65) Prior Publication Data
US 2014/0280291 A1    Sep. 18, 2014

(51) Int. Cl.
*G06F 17/30* (2006.01)

(52) U.S. Cl.
CPC .................................. *G06F 17/3097* (2013.01)

(58) Field of Classification Search
CPC .......... G06F 17/3064; G06F 17/30867; G06F 17/30864
USPC .......................................... 707/765, 766, 767
See application file for complete search history.

(56) References Cited

U.S. PATENT DOCUMENTS

| 8,027,964 | B2* | 9/2011 | Boulis ........................... 707/705 |
| 8,694,531 | B1* | 4/2014 | Stearns ......................... 707/767 |
| 2007/0124756 | A1 | 5/2007 | Covell et al. |
| 2007/0169613 | A1* | 7/2007 | Kim et al. ........................ 84/609 |
| 2008/0104624 | A1* | 5/2008 | Narasimhan ........... H04H 60/06 725/13 |
| 2008/0177708 | A1* | 7/2008 | Ayyar et al. ....................... 707/3 |
| 2009/0019002 | A1 | 1/2009 | Boulis |
| 2009/0083281 | A1* | 3/2009 | Sarig et al. ...................... 707/10 |
| 2011/0131593 | A1 | 6/2011 | Scott et al. |
| 2012/0124486 | A1* | 5/2012 | Robinson et al. ............. 715/753 |
| 2012/0269116 | A1* | 10/2012 | Xing et al. ..................... 370/328 |
| 2013/0041878 | A1* | 2/2013 | Satyanarayana .... G06F 17/3097 707/706 |

FOREIGN PATENT DOCUMENTS

WO        2013006432        1/2013

OTHER PUBLICATIONS

International Search Report and Written Opinion of corresponding PCT Serial No. PCT/US2014/025043 Aug. 29, 2014.

* cited by examiner

*Primary Examiner* — Rehana Perveen
*Assistant Examiner* — Loc Tran
(74) *Attorney, Agent, or Firm* — Middleton Reutlinger

(57) ABSTRACT

Methods and apparatus related to identifying aspects of media files that are provided to users and ranking query suggestions based on the aspects. Some implementations are directed to ranking the query suggestions of the user who was provided the media file. Some implementations are directed to ranking the query suggestions of a second user that is in the same grouping as the first user. Some implementations are directed to ranking the query suggestions of the first user based on aspects that are related to the provided media file, but not directly associated with the provided media file.

21 Claims, 6 Drawing Sheets

US 9,268,880 B2

USING RECENT MEDIA CONSUMPTION TO SELECT QUERY SUGGESTIONS

BACKGROUND

This specification is directed generally to ranking query suggestions for a partial query, and more particularly, to ranking query suggestions based on aspects of media files that have been provided to a user. A user may begin to enter a search query and desire to have suggestions that are based on the entered partial query to be provided. Search query suggestions may be selected based on the similarity between the entered partial query and a query suggestion. Query suggestions may be ranked based on the likelihood that a query suggestion is the query suggestion that the user is entering. A query suggestion engine may increase the accuracy of ranking query suggestions based on information that is specific to the user that entered the partial query. For example, a query suggestion engine may suggest and/or rank query suggestions based on previous search queries of the user.

SUMMARY

The present disclosure is directed to methods and apparatus for identifying media files that have been provided to a user and ranking search query suggestions based on one or more aspects of the provided media file. In some implementations, media files may include video files, audio files, eBooks, game applications, and/or image files. In some implementations, the provided media file may be consumed (e.g., viewed, listened to) by the user. In some implementations, the query suggestions of the user may be ranked based on one or more aspects of the media file. In some implementations, one or more aspects of an additional media file that is related to the provided media may be utilized to rank query suggestions. In some implementations, the query suggestions of a second user that is grouped with the first user may be ranked utilizing an aspect of the provided media file.

In some implementations a computer implemented method is provided that includes the steps of: identifying a provided media file, wherein the provided media file is available to a user for consumption; identifying an aspect of the provided media file, wherein the aspect is a specific attribute of the provided media file; identifying a search query entered by the user; identifying a plurality of query suggestions, wherein the query suggestions are based on the search query; determining a similarity between one or more of the query suggestions and the aspect; and selecting one or more of the query suggestions to provide to the user, wherein a given query suggestion of the query suggestions is selected based on the similarity between the given query suggestion and the aspect.

This method and other implementations of technology disclosed herein may each optionally include one or more of the following features.

The provided media file may have been shared with the user by a secondary source. The secondary source may be a secondary user, wherein the secondary user is unique from the user.

The method may further include the step of identifying a consumption of at least a portion of the provided media file by the user, wherein the given query suggestion is more likely to be provided to the user when the user consumes at least a portion of the provided media file.

The provided media file may be an audio file. The aspect may be a song title.

The method may further include the step of identifying a sharing of the provided media file by the user, wherein the given query suggestion is more likely to be provided to the user when the user shares the provided media file.

The method may further include the steps of: identifying an aspect association source, wherein the aspect association source provides aspects related to one or more aspects; and identifying a second aspect, wherein the second aspect is unique from the aspect of the provided media file, wherein the second aspect is identified based on the aspect association source, and wherein the given query suggestion is more likely to be provided to the user when the given query suggestion is indicative of the second aspect. The aspect association source may be a second media file. The aspect association source may be a mapping of aspects to user groupings, and the second aspect may be associated with a user grouping that includes the user.

The likelihood of the given query suggestion being provided to the user may be based at least in part on a time interval, wherein the time interval is the time between the user being provided the media file and the user entering the search query. The likelihood of providing a given query suggestion may be based on the difference between the time interval and a threshold time period. The threshold time period may be based on a type of media of the provided media file.

The method may further include the steps of: identifying a second user, wherein the second user is in a grouping with the user; identifying a second search query entered by the second user; identifying a plurality of second query suggestions, wherein the plurality of second query suggestions are responsive to the second search query; and selecting one or more of the plurality of second query suggestions to provide to the second user, wherein the likelihood of a given second query suggestion being provided to the user is based at least in part on the similarity between the given second query suggestion and the aspect, and wherein the given query suggestion is more likely to be provided to the second user when the given second query suggestion is indicative of the aspect. The provided media file may be shared by the user with the second user.

The provided query suggestion may be an autocomplete suggestion and the search query is a partial search query. The likelihood of providing a query suggestion may be based on the overall popularity of the media file.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify a media file that has been provided to a user, identify an aspect of the provided media file, identify a search query from the user, identify query suggestions that are responsive to the search query, and rank the query suggestions based on the aspect of the media file. Particular implementations described herein may rank query suggestions of the user based on an aspect of a media file that shares one or more aspects with the media file that was provided to the user. Particular implementations described herein may additionally and/or alternatively rank query suggestions of additional users based on the user and other users sharing a similar characteristic. For example, search query suggestions of one or more users of the same age grouping may be affected by media files that are provided to one or more users in the grouping. These rankings of query suggestions represent new ordering of query suggestions that may be derived from one or more provided media files.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
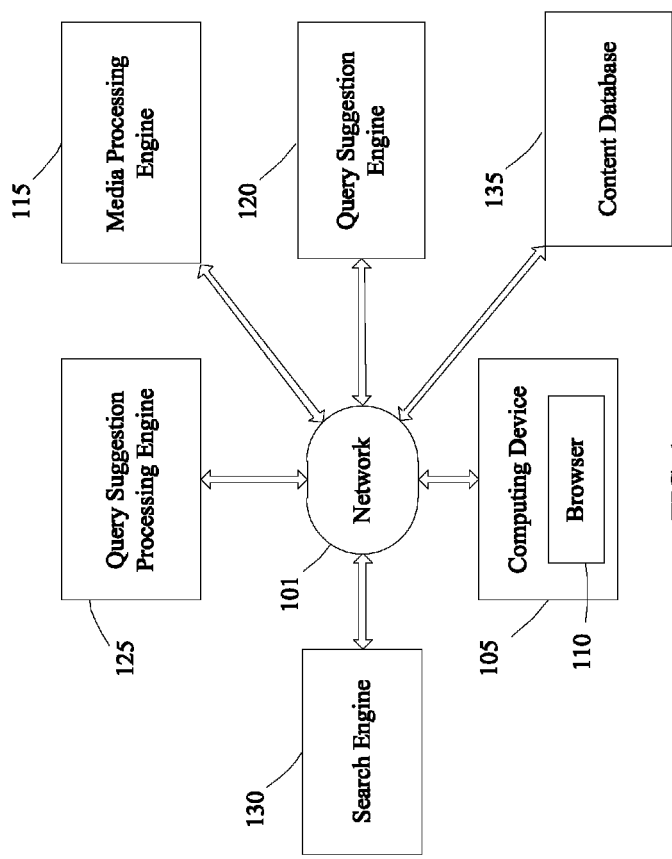
FIG. 1 is a block diagram of an example environment in which an implementation of a method of ranking search query suggestions based on media consumption may be implemented.

Referring to FIG. 1, a block diagram is illustrated of an example environment in which implementations of a method of ranking query suggestions based on media consumption may be implemented. The environment includes computing device 105 with a web browser 110, search engine 130, media processing engine 115, query suggestion engine 120, query suggestion processing engine 125, and content database 135. The environment also includes a communication network 101 that enables communication between various components of the environment.

In some implementations, a user may be provided with a media file that may be consumed by the user. Media files include files that contain a record of a communication of information from one or more sources and include audio files, video files, electronic books, games and entertainment applications, and/or image files. Consumption of a media file includes, for example, accessing a media file, listening to all or a portion of an audio media file, and/or viewing all or a portion of a video media file or image file. The media file may be provided to the user via communication network 101, such as through computing device 105. The entire media file may be provided to the user, and/or an identifier of a streaming file and/or the location of a media file may be provided to the user. For example, a user may be directed to a media file by a provided hyperlink on a webpage that is displayed in the browser 110. Also, for example, a user may receive a media file as an email attachment. Also, for example, the user may download and/or access a media file from one or more storage media, such as a CD, hard drive, flash memory, and/or DVD.

Media processing engine 115 may identify a media file that has been provided to the user for consumption. The media processing engine 115 may further identify an aspect of the provided media file based on metadata associated with the media file. For example, media processing engine 115 may use ID3 tag fields associated with a media file containing music to determine the artist, song name, genre, and/or the lyrics of the music contained in the media file. In some implementations, media processing engine 115 may provide one or more aspects of a media file to query suggestion processing engine 125, query suggestion engine 120, and/or content database 135.

In some implementations a user may interact with the search engine 130 through a web browser 110 on a client computing device 105. The computing device 105 may be, for example, a desktop computer, a laptop computer, a cellular phone, a smartphone, a personal digital assistant (PDA), a tablet computer, a navigation system, an eReader, and/or another computing device. The computing device 105 and the search engine 130 each include memory for storage of data and software applications, a processor for accessing data and executing applications, and components that facilitate communication over a communication network 101. The operations performed by the client computing device 105, the browser 110, and/or the search engine 130 may be distributed across multiple computer systems.

The computing device 105 executes one or more applications, such as web browsers (e.g., web browser 110), that enable the user to formulate queries and submit completed queries to the search engine 130. In some implementations queries may be submitted directly to the search engine 130 from the computing device 105. In some implementations completed queries may be submitted from the query suggestion engine 120 and/or the query suggestion processing engine 125 to the search engine 130.

The search engine 130 receives a query and executes the query against a search engine content database (e.g., implemented in content database 135) of available documents such as web pages, images, text documents, and/or multimedia. The search engine 130 identifies content which matches the submitted query and responds by generating search results that are transmitted to one or more devices in a form that is useful for the devices. For example, in response to a query from the computing device 105, the search engine 130 may transmit a plurality of search results to be displayed in the web browser 110 that is executing on the computing device 105. The content database 135 may include one or more storage mediums. For example, in some implementations the content database 135 may include multiple computer servers each containing one or more storage mediums.

Applications executing on the computing device 105 may also provide partial queries being formulated by users, before the users have indicated completion of the queries. The applications may be, for example, a web browser 110, a toolbar running in the web browser 110, an e-mail application, a text-messaging application, and/or a search client running on the computing device 105. In some implementations the applications provide each character of a query as it is typed or otherwise entered by the user. In some implementations the applications provide multiple characters at a time, optionally following a pause by the user between character entries.

A partial query is a query formulated by a user prior to an indication by the user that the query is a completed query. In some implementations a user may indicate a completed query by entering a carriage return and/or other character. In some implementations a user may indicate a completed query by selecting a search button or other submission button in a user interface presented to the user. In some implementations a user may indicate a completed query by speaking a command in a speech user interface. In some implementations a user may indicate a completed query by pausing more than a predetermined amount of time during entering of the query. Other forms of providing a partial query and/or indicating a completed query may additionally and/or alternatively be utilized.

In response to a partial query entered by a user, the computing device 105 may facilitate entry of user input by providing suggested inputs to the user. For example, when the user enters one or more characters, the computing device 105 can provide query suggestions that are selected using the one or more characters. In some implementations, the query suggestions may be provided to the computing device 105 by query suggestion engine 120 and/or query suggestion processing engine 125. The query suggestions that are provided may include words or phrases that include the one or more characters that were entered by the user. For example, complete words or extended phrases can be suggested for partial words or partial phrases that a user has entered (e.g., using a physical or virtual keyboard). The query suggestions can also include words or phrases that are similar to (e.g., synonyms or spelling corrections of) the user input. The user can interact with (e.g., tap, click, or otherwise affirmatively select) one of the provided query suggestions to enter the text of the selected query suggestion.

Figure 3A:
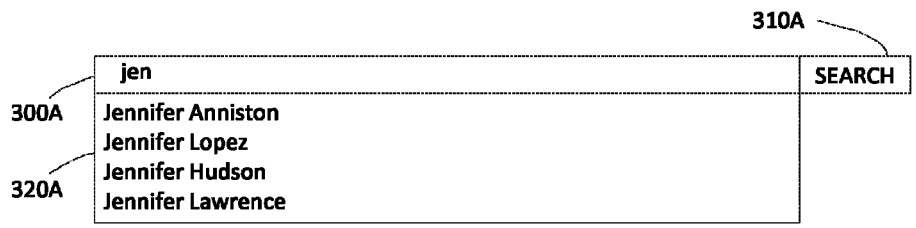
FIG. 3A illustrates a partial screenshot of an example environment that can be used to provide query suggestion results to a user.
Figure 3B:
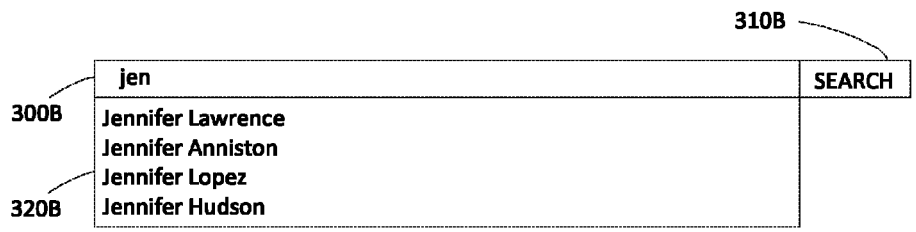
FIG. 3B illustrates another partial screenshot of an example environment that can be used to provide query suggestions based on media consumption of a user.
Figure 3C:
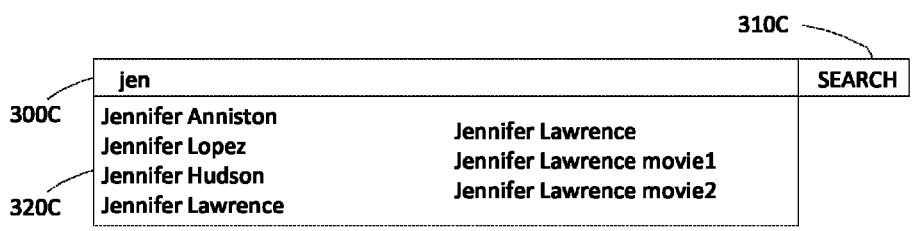
FIG. 3C illustrates another partial screenshot of an example environment that can be used to provide query suggestion results to a user and query suggestions based on media consumption of a user in separate listings.

The query suggestions may be displayed to a user in a user interface of the computing device 105. For example, the query suggestions may be displayed within a cascaded drop down menu of the search field of an application, such as a web browser executing on the computing device 105, as the user is typing the query, such as the partial user interface that is illustrated in FIGS. 3A and 3B and described herein. Also, for example, the query suggestions may be displayed in a plurality of separately selectable cells arranged in one or more rows or columns in a user interface as the user is typing the query, such as the partial user interface display that is illustrated in FIG. 3C and described herein. For example, query suggestions that were identified based on the consumption of media by a user may be displayed in a column separate from other query suggestions. In some implementations, one or more search results for a query suggestion may also optionally be displayed as the user is typing the query.

In some implementations, in response to a partial query being entered at computing device 105, the search engine 130 may receive the query and forward the partial query to the query suggestion engine 120. In some implementations, in response to a query being entered at computing device 105, the one or more applications executing on the computing device 105 may optionally directly forward the query to the query suggestion engine 120. For example, in some implementations, the browser 110 may directly forward the partial query to the query suggestion engine 120. The query suggestion engine 120 may include memory for storage of data and software applications, a processor for accessing data and executing applications, and components that facilitate communication over the communication network 101. The query suggestion engine 120 may match a submitted partial query to one or more of a plurality of query suggestions that are an appropriate match to the query. In some implementations the query suggestions may represent potential completed queries that may be provided to a user to enable the user to choose one of the query suggestions as a basis for utilization in a search or other information retrieval application.

In some implementations the query suggestions may include those determined based on a list of past user queries, a list of automatically generated queries, and/or real time automatically generated queries. In some implementations, the query suggestions may include those identified based on data retrieved from a database. For example, the query suggestion engine 120 may use prefix based matching to identify query suggestions from a list of past user queries and/or from matches to entries in the content database 135. Any listing of past user queries, aspects of consumed media, and/or past automatically generated queries may optionally be stored in an query suggestion content database such as content database 135, for potential utilization as query suggestions and/or as a basis for query suggestions. These autocomplete suggestions provided by the query suggestion engine 120 represent words or phrases that a user may want to include in addition to or instead of the partial queries actually being typed.

In some implementations the content database 135 may include one or more query suggestions that have been determined, scored, and/or sorted according to one or more methods and/or apparatus described herein. Such query suggestions may be provided to a user. In some implementations the query suggestion engine 120 and/or media processing engine 115 may provide the query suggestions to a user via the search engine 105, the query suggestion processing engine 125, and/or to the computing device 105 directly.

In some implementations the query suggestion engine 120 may provide query suggestions to the query suggestion processing engine 125. The query suggestion processing engine 125 may determine additional query suggestions; determine scores for one or more of the provided query suggestions and/or one or more of the additional query suggestions; determine which query suggestions to provide to a user; and/or rank one or more of the provided query suggestions and/or one or more of the additional query suggestions. In some implementations, the query suggestion processing engine 125 may determine scores for and/or rank search query suggestions based on the similarity of one or more aspects of media files consumed by the user and search query suggestions provided by the query suggestion engine 120.

For example, the query suggestion processing engine 125 may determine scores for query suggestions and/or the additional query suggestions based on one or more aspects of one or more media files, which may be provided to query suggestion processing engine 125 by media processing engine 115 and/or query suggestion engine 120. The query suggestions provided to the query suggestion processing engine 125 may be provided with associated scores. Scores for the query suggestions and/or new scores for some of the provided query suggestions may be determined based at least in part on the provided aspects of media files. The determination of scores for the query suggestions may include one or more aspects of the methods of FIGS. 2, 4, and/or 5, such as steps 220, 420, and/or 520.

Also, for example, the query suggestion processing engine 125 may rank one or more of the provided search query suggestions and/or one or more additional query suggestions. For example, the query suggestion processing engine 125 may sort one or more of the provided query suggestions and/or one or more of the additional query suggestions based at least in part on scores assigned to each of such query suggestions. Also, for example, the ranking may additionally and/or alternatively be based on other factors such as the number of terms in the suggestions, the length of term(s) in the query suggestions, and/or display parameters of the computing device 105. In some implementations ranking of the query suggestions may be utilized to determine which query suggestions are provided to a user and/or in which order the query suggestions are displayed to the user.

In some implementations, the query suggestion processing engine 125 may transmit the determined additional query suggestions, determined scores for one or more of the query suggestions, and/or the ranking of the query suggestions for storage in a database such as content database 135. In some implementations, stored data may optionally be associated with a corresponding partial query in the database for future retrieval in response to a future query suggestion request for the partial query by one or more users. In some implementations, any stored data may optionally be mapped to a particular media file and/or one or more particular aspects of a media file. In some implementations the query suggestion engine 120 may supply existing query suggestions for a given partial query to query suggestion processing engine 125 to enable query suggestion processing engine 125 to determine additional query suggestions and score and/or rank such data for storage in a database for future retrieval. In some implementations, the query suggestion engine 120 may supply query suggestions for a real time query to enable query suggestion processing engine 125 to determine additional query suggestions and score and/or rank such data for providing query suggestions in response to the real time query. In some implementations, the query suggestion engine 120 may supply query suggestions for a real time query to enable query suggestion processing engine 125 to determine which of a plurality of supplied query suggestions to display in response to the real time query. In some implementations, the query suggestion processing engine 125 provides query suggestions to a user. In some implementations the query suggestion processing engine 125 may provide the query suggestions to a user via the search engine 130, the query suggestion engine 120, the query suggestion processing engine 125, and/or to the computing device 105 directly.

In some implementations the search engine 130 and/or the computing device 105 may optionally additionally or alternatively provide a completed query to the query suggestion engine 120. A completed query is a query that the user has not indicated is complete. The query suggestion engine 120 may then match the completed query to one or more query suggestions to determine one or more query suggestions for the user's completed query. The query suggestion engine 120 and/or the query suggestion processing engine 125 then provides these query suggestions to the user. In some implementations the query suggestions may be provided to a user via the search engine 130, the query suggestion processing engine 125, and/or to the computing device 105 directly. The query suggestions may, for example, be embedded within a search results web page to be displayed in an application, such as the web browser 110, as potential further search options.

The communication network 101 facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques.

Many other configurations are possible having more or less components than the environment shown in FIG. 1. For example, although the query suggestion processing engine 125 and the query suggestion engine 120 are each illustrated alone in FIG. 1, it is understood that the query suggestion processing engine 125 and/or the query suggestion engine 120 may optionally be combined with one another and/or with one or more of the media processing engine 115, the search engine 130, and/or the computing device 105 in some implementations.

Figure 2:
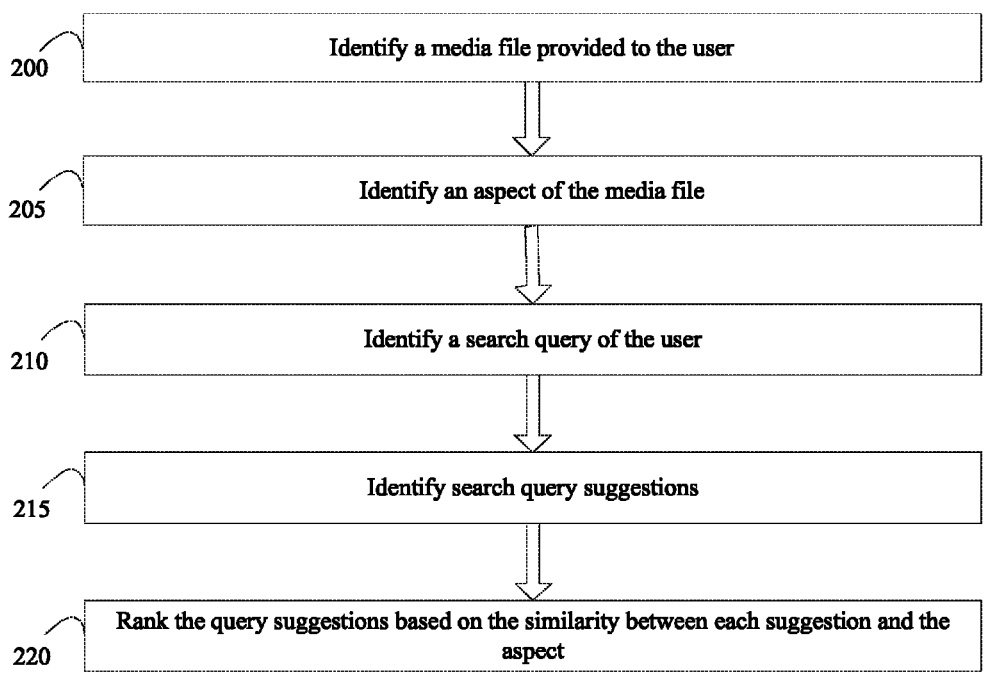
FIG. 2 is a flow chart illustrating an example method of ranking search query suggestions based on an aspect of identified media consumption of a user.

Referring to FIG. 2, a flow chart of an example method of ranking search query suggestions based on an aspect of identified media consumption of a user is illustrated. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the media processing engine 115, the query suggestion engine 120 and/or the query suggestion processing engine 125 of FIG. 1.

At step 200, a media file that has been provided to the user is identified. In some implementations, the media file may not be accessed and/or consumed by the user. For example, a user may be provided a link to a media file on a social media site but the user may not select the link to access the media file. In some implementations, the media file may be identified once the user has started to consume the media file. For example, the web browser 110 may identify the user selecting a hyperlink and provide the media processing engine 115 with an identifier of the media file, such as a URL and/or a file location. In some implementations, the media file may be identified when the user has completed consuming the media file. The media file may be provided to the user utilizing one or more applications on the computing device 105, through browser 110, and/or through an additional computing device. In some implementations, the media processing engine 115 may identify the media file that has been provided to the user. The identification of the media file may share one or more characteristics with one or more steps of FIG. 4 and FIG. 5, such as steps 400 and 500.

In some implementations, the user may actively locate a media file and indicate that the media file should be made available to the user for consumption. For example, the user may locate a hyperlink to a media file utilizing web browser 110 and download the media file locally to consume the media file. Also, for example, the user may purchase a media file from a web-based media file marketplace and access one or more media files via the Internet. In some implementations, the user may be provided a media file without actively obtaining the media file. For example, the user may be provided a media file by another user through a social media site, an email, and/or through a file sharing application.

At step 205, an aspect of the media file that is provided to the user is identified. The aspect may be identified by a module that shares one or more aspects with the media processing engine 115. The media processing engine 115 may identify an aspect of the provided media file based on metadata associated with the media file. For example, media processing engine 115 may use ID3 tag fields associated with a media file containing music to determine the artist, song name, genre, and/or the lyrics of the music contained in the media file. In some implementations, media processing engine 115 may provide query suggestion processing engine 125 and/or the query suggestion engine 120 with one or more identified aspects of a consumed media file. In some implementations, the identification of one or more aspects of the media file may share one or more characteristics with one or more steps in the methods of FIG. 4 and/or FIG. 5, such as steps 405 and 505.

For example, the user may be provided a media file containing "Movie1." "Movie1" may be identified by the media processing engine 115 as being provided to the user. Aspects of "Movie1" may be identified by the media processing engine 115, which may include the name of the movie, the release date of the movie, performers in the movie, and/or one or more non-text aspects, such as images from the movie and/or movie poster art. For example, the media processing engine 115 may identify "Jennifer Lawrence" as an actor in the movie based on metadata associated with the media file of the movie, such as ID3 tag information. Also, for example, the media processing engine 115 may be provided with an aspect of the media file, such as the title, and utilize the title to perform an Internet-based search to identify one or more additional aspects of the media file. In some implementations, one or more aspects of a media file may be stored in a database, such as content database 135, and retrieved by media processing engine 115 and/or query suggestion engine 120.

In this specification, the term "database" will be used broadly to refer to any collection of data. The data of a database does not need to be structured in any particular way, or structured at all, and it can be stored on storage devices in one or more locations. Thus, for example, the content database 135 may include multiple collections of data, each of which may be organized and accessed differently.

In some implementations the content database 135 may include links between nodes and data that identifies the relationship between entities represented by linked nodes. For example, an online encyclopedia having pages directed to each of a group of entities and websites directed to particular types of entities (e.g., actors, directors, producers, politicians, sports stars) may be utilized to identify aspects of a media file. Other sources may also include one or more database of structured data that is not freely accessible online. At step 210, a search query of the user may be identified. The search query may be entered by the user via a computing device executing a web browser, such as computing device 105 and web browser 110. In some implementations, the user may enter a complete search into the web browser 110 and indicate that the query is complete, such as by clicking a search button and/or stopping typing for a predetermined period of time. In some implementations, the user may enter a partial search query in anticipation of receiving suggested queries. The completed and/or partial search queries may be provided to a search engine that shares one or more aspects with search engine 130.

At step 215 a plurality of query suggestions responsive to the query identified at step 210 a query are identified. For example, for a partial query of "jen", the query suggestions illustrated in FIG. 3A may be obtained. The query suggestions of FIG. 3A are illustrated in the drop-down box below the partial query. For the query "jen," the query suggestions all contain "jen" as the prefix and contain additional text to form a complete word or phrase starting with "jen". In some implementations the query suggestions may be transmitted to the query suggestion processing engine 125 from the query suggestion engine 120 via communications network 101. The query suggestions may be transmitted in response to a user on computing device 110 entering a partial query and the search engine 130 transmitting the partial query to the query suggestion engine 120.

At step 220, the query suggestions identified at step 215 are ranked based on one or more aspects of a provided media file that were identified at step 205. For example, media processing engine 115 may identify that a user was provided "Movie1" and determine that the aspect "Jennifer Lawrence" was associated with "Movie1." "Jennifer Lawrence" may be boosted in rankings by a determined number of places; and/or a score associated with the query suggestion may be increased and/or may be provided as a query suggestion when it otherwise would not have been provided in a ranked list of query suggestions. Media processing engine 115 may provide the aspect "Jennifer Lawrence" to query suggestion engine 120 and/or to content database 135 for future utilization. In some implementations, query suggestion processing engine 125 may receive identified aspects from media processing engine 115, from query suggestion engine 120, and/or may retrieve one or more aspects from content database 135.

In some implementations, the ranking of a query suggestion that shares similarities with an aspect may be boosted by adjusting defined scores that are provided with the query suggestions. For example, "Jennifer Anniston" may have a defined score of 1.5 and "Jennifer Lawrence" may have a defined score of 1.0. Query suggestion processing engine 125 may adjust the score of "Jennifer Lawrence" to 2.0 based on the identified aspect and boost "Jennifer Lawrence" above "Jennifer Anniston" in the ranking of query suggestions. In some implementations, the query suggestion processing engine 125 may boost a query suggestion that shares similarities with the identified aspect a determined number of places in the ranking of query suggestions. For example, query suggestion processing engine 125 may boost query suggestions related to aspects of the consumed media file two places in the provided ranked query suggestions, which would rank "Jennifer Lawrence" above "Jennifer Anniston."

In some implementations, the query suggestions processing engine 125 may rank query suggestions received from query suggestion engine 120 based on the aspect received from media processing engine 115. For example, query suggestion processing engine 125 and/or query suggestion engine 120 may rank a plurality of query suggestions based on similarities between an aspect and one or more individual query suggestions. For example, in some implementations, similarity may be based on one or more algorithms, such as a Levenshtein edit distance, a Jaro-Winkle edit, a Jaccard index, a Masi distance; and/or character counts between the text provided for the aspect and the text of a query suggestion. In some implementations, query suggestions that match an aspect may be sorted to a higher position in a provided list of query suggestions, provided in a separate list, and/or scores associated with query suggestions may be adjusted based on the match and/or the likelihood of a match between the aspect and the query suggestion.

In some implementations, the ranking of search query suggestions may be partially based on the user sharing the media file with one or more additional sources. For example, media processing engine 115 and/or one or more applications executing on computing device 105 may identify that the user has provided the media file to another user, posted the media file and/or a hyperlink to a media file on a social media site, and/or attached a media file to an email. Media processing engine 115 and/or one or more additional applications may provide information about the sharing of the media file to query suggestion processing engine 125 and/or query suggestion engine 120 to utilize in ranking and/or identifying query suggestions. For example, a media file that a user has provided to other users is likely of importance to the user and query suggestions related to the media file may be ranked to reflect the likely importance of the media file.

In some implementations, the ranking of search query suggestions may be based on the passage of time between the user providing a search query and the user being provided a media file, the user consuming the media file, and/or the user sharing the media file. For example, search query suggestions that share similarities with an aspect of a media file may be boosted when the user transmits a search query within a threshold period of time from when an aspect of a media file is identified. In some implementations, the effect of the boosting of query suggestions may decrease as the time between the user being provided the media and the user providing a search query increases. Also, for example, a query suggestion may be boosted based on the time between a user being provided a media file and the user consuming the media file.

In some implementations, the effect of time passage on the ranking of search suggestions based on an aspect may be dependent on the type of media file that was provided to the user. For example, some media files may be more likely to trigger searches in a shorter period of time from the time that a user accesses the media file and the likelihood of the user providing a search query related to the media file may decrease with time passage. For example, the user may access an audio media file of a currently popular song. The media processing engine 115 may boost query suggestions based on that media file in the short term and decrease the effectiveness of the aspects of the media file with time passage. In some implementations, the effect of media file aspects may increase with time passage.

In some implementations, the ranking may be adjusted based on one or more terms in the partial search query. For example, a search query may include the phrase "movie I watched last year" may indicate that the user is interested in aspects of a video media file that was accessed approximately a year ago and query suggestions based on aspects that were initially identified approximately a year ago may be boosted more for the provided query suggestions than a search phrase that includes the phrase "movie from last week." In some implementations, the partial query may include a media type and query suggestions related to that movie type may be boosted. For example, a partial search query with the word "movie" may boost query suggestions related to movies more than a partial search query that contains the word "song."

In some implementations, the ranking of query suggestions may be based on the overall popularity of the media file. For example, aspects related to a media file that does not have widespread popularity may be more likely to be of interest to users who have consumed the media file than a media file that is commonly viewed by a widespread audience. For example, a user may listen to an audio file of a popular song entitled "Song Popular" and an audio file of a less popular song entitled "Song Not Popular." Aspects may be identified for both songs and the user may enter a partial search query "son." The query suggestion engine 125 may determine that the user may be more likely to be searching for information about "Song Not Popular" than "Song Popular" because "Song Not Popular" is more individualized to the user than "Song Popular," which may be a common search term due to the popularity of the song.

FIG. 3A is a partial screenshot that illustrates an example environment that can be used to provide query suggestions to a user. In FIG. 3A, the partial screen shot includes a search field representation 300A and a search button representation 310A. In this example, the user has entered the partial search query "jen" into the search field representation and a drop down menu 320A of the search field is displayed. A module that may share one or more characteristics with query suggestion engine 120 may identify one or more candidate autocomplete phrases that may be associated with the prefix "jen." The query suggestion engine 120 may identify query suggestions based on, for example, a list of past user queries, a list of automatically generated queries, and/or real time automatically generated queries. Query suggestion engine 120 and/or query suggestions processing engine 125 may associate a score with each identified query suggestion and rank the plurality query suggestions based on the associated scores. The drop down menu 320A includes four query suggestions that are based on the partial search query "jen." Query suggestion engine 120 and/or query suggestion processing engine 125 may determine that "Jennifer Anniston" is the most likely query completion suggestion for searches beginning with the prefix "jen" based on a defined score associated with the search phrase "Jennifer Anniston."

The user may optionally choose any of the query suggestions and utilize the suggestion as a completed query or the basis for a completed query to retrieve information based on the identified query suggestion. In some implementations, the user may request additional display sets of query suggestions to be displayed. For example, in some implementations a user may scroll within the drop down menu 320A to display one or more additional query suggestions from further display sets. In some implementations, the user may indicate that the search query that is entered into search field 300A is complete by selecting search button 310A. In some implementations, one or more of the query suggestions in drop down menu 320A may be clickable and the user may choose a search suggestion by selecting a suggestion in drop down menu 320A. FIG. 3B is a partial screenshot that illustrates another example environment that can be used to provide query suggestions to a user that are ranked based on aspects of a media file that is provided to a user. In FIG. 3B, the partial screen shot includes a search field representation 300B and a search button representation 310B. The query suggestions in drop down menu 320B are the same query suggestions as the query suggestions in FIG. 3A with a different order. The ranking and/or ordering of the query suggestions in FIG. 3B may be based on one or more of the methods of ranking query suggestions based on an aspect of a provided media file as described herein. For example, Jennifer Lawrence may be boosted in the ordering and/or ranking based on the user being provided "Movie1" and media processing engine 115 identifying "Jennifer Lawrence" as an aspect of "Movie1" and providing the aspect to query suggestion engine 120 and/or query suggestion processing engine 125.

FIG. 3C is a partial screenshot that illustrates another example environment that can be used to provide query suggestions to a user that are ranked based on aspects of a media file that is provided to a user. In FIG. 3C, the partial screen shot includes a search field representation 300C and a search button representation 310C. The query suggestions in drop down menu 320C are organized in two columns and share similarities with the query suggestions of FIG. 3A and FIG. 3B. For example, the ranking and/or ordering of the query suggestions in the columns of FIG. 3C may be based on one or more of the methods described herein. In some implementations, the query suggestions in the left column may be ranked and/or ordered without being provided an aspect from a media file. For example, "Jennifer Lawrence" may appear in the query suggestions without a boosting of the ranking of the query suggestions. In some implementations, the left column of query suggestions may alternatively have the same ordering as the query suggestions in FIG. 3B based on one or more aspects of a media file that was provided to the user. For example, "Jennifer Lawrence" may be boosted in the ordering and/or ranking based on the user being provided "Movie1" and media processing engine 115 identifying "Jennifer Lawrence" as an aspect of "Movie1" and providing the aspect to query suggestion engine 120.

The second column of drop down menu 320C may include query suggestions based solely on aspects of media files. The illustrated right column includes "Jenner Lawrence," which may be an identified aspect from a media file that was provided to the user, such as, for example, "Movie1." The remaining entries in the right column may be formulated based on "Jennifer Lawrence" as a partial query and/or may be formulated based on one or more of the methods described herein, such as the method illustrated in FIG. 4. For example, the remaining entries in the right column may be the result of one or more components of the system identifying one or more aspects from one or more additional media files and utilizing the additional aspects to rank and/or sort query suggestions.

Figure 4:
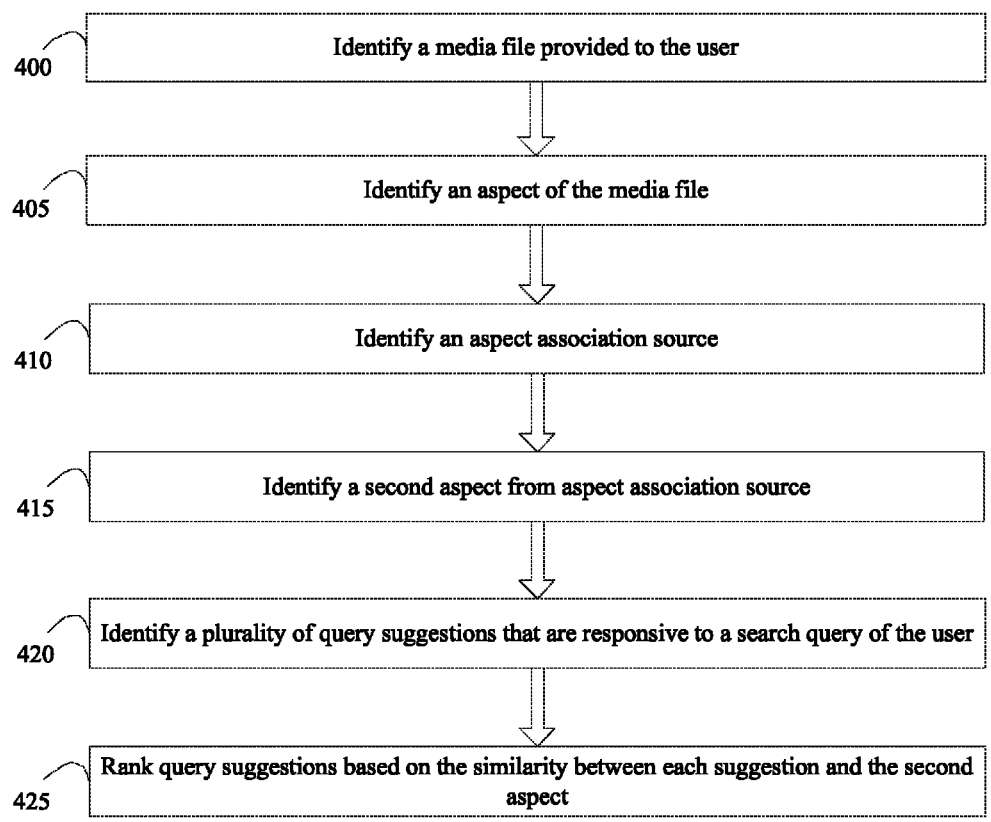
FIG. 4 is a flow chart illustrating an example method of ranking search query suggestions based on an aspect of a media file that shares an aspect with a media file that was consumed by a user.

Referring to FIG. 4, a flow chart illustrating an example method of ranking search query suggestions based on a second aspect that is related to the first aspect is provided. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the media processing engine 115, the query suggestion engine 120 and/or the query suggestion processing engine 125 of FIG. 1.

At step 400, a media file that has been provided to the user is identified. In some implementations, the media file may not be accessed and/or consumed by the user. In some implementations, the media file may be identified once the user has started to consume the media file. In some implementations, the media file may be identified when the user has completed consuming the media file. The media file may be provided to the user utilizing one or more applications on the computing device 105, through browser 110, and/or through an additional computing device. In some implementations, the media processing engine 115 may identify the media file that has been provided to the user. The identification of the media file may share one or more characteristics with one or more steps of FIG. 2 and/or FIG. 5, such as steps 200 and 500.

At step 405, an aspect of the media file that is provided to the user is identified. The aspect may be identified by a module that shares one or more aspects with the media processing engine 115. The media processing engine 115 may identify an aspect of the provided media file based on metadata associated with the media file. For example, media processing engine 115 may use ID3 tag fields associated with a media file containing music to determine the artist, song name, genre, and/or the lyrics of the music contained in the media file. In some implementations, media processing engine 115 may provide query suggestion processing engine 125 with one or more aspects of the media file to the query suggestion engine 120 and/or may provide content database 135 with one or more aspects of a consumed media file. In some implementations, the identification of one or more aspects of the media file may share one or more characteristics with one or more steps in the methods of FIG. 2 and/or FIG. 5, such as steps 205 and 505.

At step 410, an aspect association source is identified. In some implementations, the aspect association source may be identified by a module that shares one or more characteristics with one or more components of FIG. 1, such as search engine 130, query suggestion engine 120, and/or media processing engine 115. In some implementations, the aspect association source is a second media file that shares an aspect with the provided media file. In some implementations, the aspect association source may be an online encyclopedia. In some implementations, the aspect association source may be a database.

In some implementations, a second media file may be utilized to associate related aspects. For example, the user may be provided with "Movie1" for consumption and the media processing engine 120 may identify "Jennifer Lawrence" as an actress in "Movie1." The media processing engine 120 may identify a second media file that includes "Jennifer Lawrence" as an associated aspect and select one or more additional aspects associated with the second media file.

In some implementations, one or more databases may share associations between aspects. For example, the user may be provided "Movie1" for consumption and the media processing engine 115 may identify "Jennifer Lawrence" as an actress in "Movie1" at step 405. At step 410, one or more components may access a database that may provide the media processing engine 115 with one or more movies that also include "Jennifer Lawrence" as an actress. In some implementations, one or more components may utilize an Internet-based search to identify one or more additional media files that are associated with an aspect.

In some implementations, a database of aspects and user grouping may be utilized as an aspect association source. The database may associate one or more aspects and/or media files with a grouping of users based on the likelihood that users in that grouping may share similar preferences in some aspects of media consumption. Examples of grouping include common age group, geographic locations, identified or provided preferences of users, common gender, common income class, etc. For example, a user may be provided "Movie1" for consumption. One or more modules may associate the user with a particular grouping based on, for example, the age of the user. Media processing engine 115 may identify that users in the same age grouping as the first user who also viewed "Movie1" are likely to view "Movie2" and identify one or more aspects of "Movie2."

At step 415, a second aspect is identified based on the aspect association source. Step 415 may share characteristics with one or more steps of the methods described in FIGS. 2, 4, and/or 5, such as steps 205, 405, and/or 505.

At step 420, a plurality of query suggestions responsive to a query from the user are identified. In some implementations the query suggestions may be transmitted to the query suggestion processing engine 125 from the query suggestion engine 120 via communications network 101. The query suggestions may be transmitted in response to a user on computing device 105 entering a partial query and the computing device 130 transmitting the partial query to the query suggestion engine 120. The method of identifying the plurality of query suggestions identified at step may share one or more aspects with one or more steps of the method illustrated in FIG. 2, such as steps 210 and 215.

At step 425, the query suggestions identified at step 420 are ranked based on the one or more aspects of that were identified at step 400. In some implementations, query suggestion processing engine 125 may receive identified aspects from media processing engine 115, from query suggestion engine 120, and/or may retrieve one or more aspects from content database 135. The method of ranking the query suggestions at step 520 may share one or more aspects with step of the methods illustrated in FIG. 2 and/or FIG. 5, such as steps 220 and/or 520.

Figure 5:
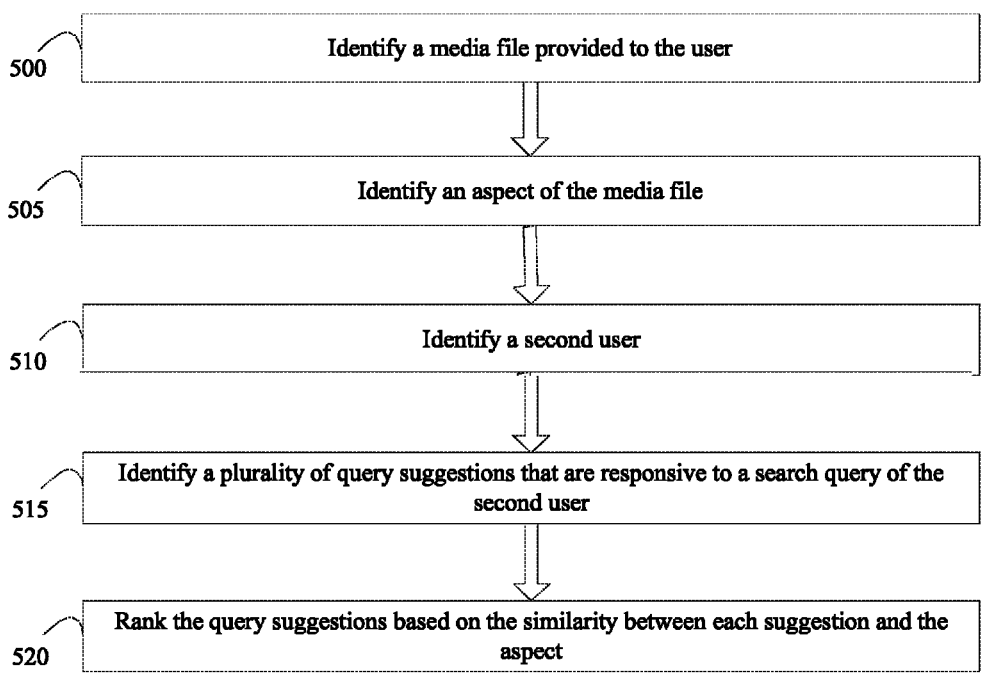
FIG. 5 is a flow chart illustrating an example method of ranking search query suggestions for a user based on an aspect of a media file that was consumed by a second user.

Referring to FIG. 5, a flow chart illustrating an example method of ranking search query suggestions for a user based on an aspect of a media file that was consumed by a second user is provided. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, media processing engine 115, the query suggestion engine 120 and/or the query suggestion processing engine 125 of FIG. 1.

At step 500, a media file that has been provided to the user is identified. In some implementations, the media file may not be accessed and/or consumed by the user. In some implementations, the media file may be identified once the user has started to consume the media file. In some implementations, the media file may be identified when the user has completed consuming the media file. The media file may be provided to the user utilizing one or more applications on the computing device 105, through browser 110, and/or through an additional computing device. In some implementations, the media processing engine 115 may identify the media file that has been provided to the user. The identification of the media file may share one or more characteristics with one or more steps of FIG. 2 and FIG. 4, such as steps 200 and 400.

At step 505, an aspect of the media file that is provided to the user is identified. The aspect may be identified by a module that shares one or more aspects with the media processing engine 1125. The media processing engine 115 may identify an aspect of the provided media file based on metadata associated with the media file. For example, media processing engine 115 may use ID3 tag fields associated with a media file containing music to determine the artist, song name, genre, and/or the lyrics of the music contained in the media file. In some implementations, media processing engine 115 may provide query suggestion processing engine 125 with one or more aspects of the media file to the query suggestion engine 120 and/or may provide content database 135 with one or more aspects of a consumed media file. In some implementations, the identification of one or more aspects of the media file may share one or more characteristics with one or more steps in the methods of FIG. 2 and/or FIG. 4, such as steps 205 and 405.

At step 510, a second user who shares one or more characteristics with the first user is identified. The grouping of the first user and the second user may be identified by one or more modules of FIG. 1, by one or more actions of the users, and/or by one or more additional modules. For example, the first user and the second user may be grouped based on or more aspects that are shared by the users and one or more components of the search engine 130, one or more computing devices 105, and/or browsers 110 may identify the shared characteristics and associate the users into a grouping. In some implementations, the users may facilitate the grouping by, for example, joining the same social network, subscribing to the same online message board system, and/or sharing email addresses. In some implementations, one or more user characteristics may be identified for members in the population. A group of user may be identified based on multiple users sharing one or more user characteristics and/or having one or more similar user characteristics. Groupings may include common age group, geographic locations, identified or provided preferences of users, common gender, common income class, etc.

At step 515, a plurality of query suggestions responsive to a query from the second user are identified. In some implementations the query suggestions may be transmitted to the query suggestion processing engine 125 from the query suggestion engine 120 via communications network 101. The query suggestions may be transmitted in response to a user on computing device 110 entering a partial query and the computing device 130 transmitting the partial query to the query suggestion engine 120. The method of identifying the plurality of query suggestions identified at step may share one or more aspects with steps from the methods in FIG. 2, such as steps 210 and 215.

At step 520, the query suggestions identified at step 515 are ranked based on one or more aspects of a provided media file that were identified at step 500. In some implementations, query suggestion processing engine 125 may receive identified aspects from media processing engine 115, from query suggestion engine 120, and/or may retrieve one or more aspects from content database 135. The method of ranking the query suggestions at step 520 may share one or more aspects with the methods illustrated in FIG. 2 and/or FIG. 4, such as steps 220 and/or 425.

Although methods of ranking search query suggestions based on aspects of media files provided to a user are illustrated in the Figures, the methods may additionally and/or alternatively be utilized to rank query suggestions based on one or more aspects of a media file. Certain implementations of the methods of processing query suggestions have been described as taking place in a substantially real time environment. However, one or more aspects of methods described herein may be implemented in an offline mode. For example, implementations of methods described herein may be utilized to identify an aspect of a provided media file that has been provided to a user and rank and/or sort query suggestions based on the aspect in response to a query that may be made available for utilization in a real time environment in processing query suggestions.

Figure 6:
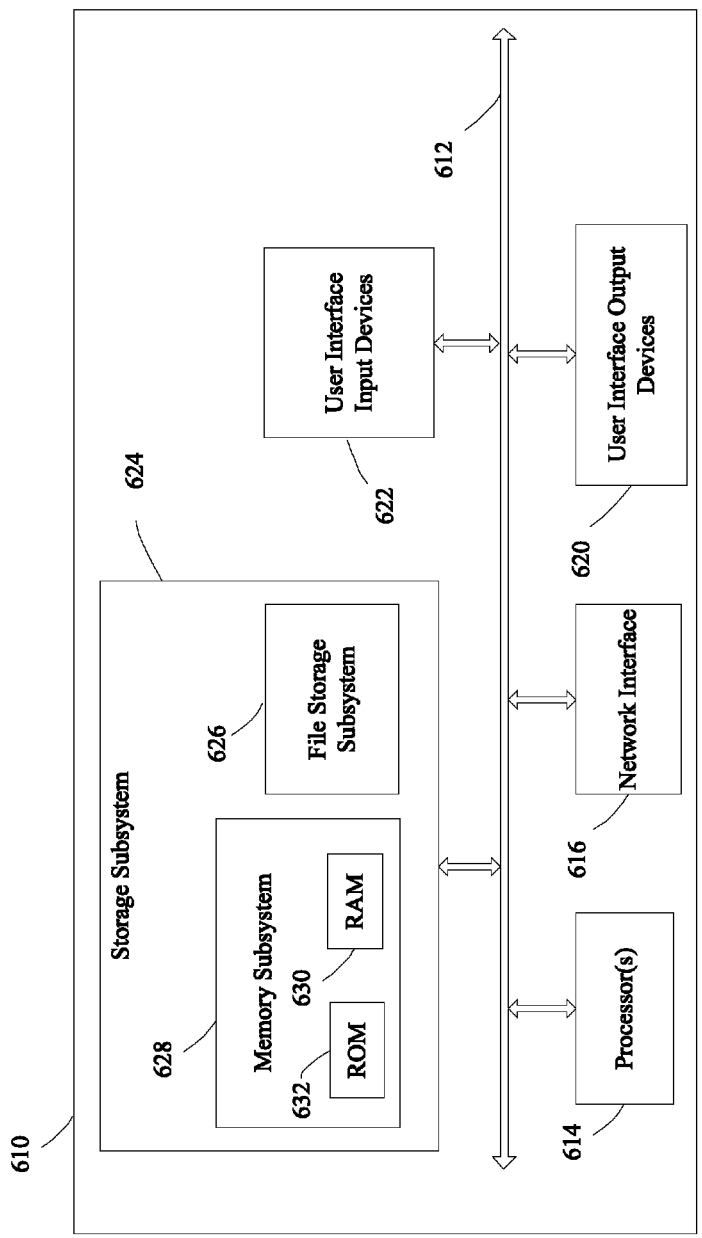
FIG. 6 illustrates a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to identify a media file that has been provided to a user for consumption and rank search query suggestions based on an aspect of the consumed media file according to one or more processes described herein.

These software modules are generally executed by processor 614 alone or in combination with other processors. Memory 626 used in the storage subsystem can include a number of memories including a main random access memory (RAM) 630 for storage of instructions and data during program execution and a read only memory (ROM)

632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive implementations have been described and illustrated herein, a variety of other means and/or structures for performing the function and/or obtaining the results and/or one or more of the advantages described herein, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:
1. A computer implemented method, comprising:
    identifying an association of a user to a provided media file, wherein the provided media file is available to the user for consumption;
    identifying an aspect of the provided media file, wherein the aspect is a specific attribute of the provided media file;
    identifying a search query entered by the user;
    identifying a plurality of query suggestions, wherein the query suggestions are based on the search query;

determining, based on identifying the association of the user to the provided media file, a similarity between one or more of the query suggestions and the aspect of the provided media file; and selecting one or more of the query suggestions to provide to the user, wherein a given query suggestion of the query suggestions is selected based on the similarity between the given query suggestion and the aspect;

wherein selecting the given query suggestion to provide to the user is further based on a difference between a time interval and a threshold time period, wherein the time interval is based on the time between the user being provided the media file or consuming the media file and the user entering the search query, and wherein the threshold time period is dependent on a type of media of the provided media file.

2. The method of claim 1, wherein the provided media file has been shared with the user by a secondary source.

3. The method of claim 2, wherein the secondary source is a secondary user, and wherein the secondary user is unique from the user.

4. The method of claim 1, further comprising identifying a consumption of at least a portion of the provided media file by the user, wherein selecting the given query suggestion to provide to the user is further based on identifying the consumption of at least a portion of the provided media file.

5. The method of claim 1, wherein the provided media file is an audio file.

6. The method of claim 5, wherein the aspect is a song title.

7. The method of claim 1, further comprising identifying a sharing of the provided media file by the user, wherein selecting the given query suggestion to provide to the user is further based on identifying the sharing of the provided media file.

8. The method of claim 1, further comprising:
identifying an aspect association source, wherein the aspect association source provides aspects related to one or more aspects; and
identifying a second aspect, wherein the second aspect is unique from the aspect of the provided media file, wherein the second aspect is identified based on the aspect association source, and wherein selecting the given query suggestion is further based on the given query suggestion being indicative of the second aspect.

9. The method of claim 8, wherein the aspect association source is a second media file.

10. The method of claim 8, wherein the aspect association source is a mapping of aspects to user groupings, and wherein the second aspect is associated with a user grouping that includes the user.

11. The method of claim 1, further comprising:
identifying a second user, wherein the second user is in a grouping with the user but has not consumed the provided media file;
identifying a second search query entered by the second user;
identifying a plurality of second query suggestions, wherein the plurality of second query suggestions are responsive to the second search query; and
selecting one or more of the plurality of second query suggestions to provide to the second user, wherein a likelihood of a given second query suggestion being provided to the second user is determined based at least in part on a similarity between the given second query suggestion and the aspect and is determined based on identifying the association of the user to the provided media file and the second user being in the grouping with the user.

12. The method of claim 11, wherein the provided media file is shared by the user with the second user.

13. The method of claim 1, wherein the provided query suggestion is an autocomplete suggestion and the search query is a partial search query.

14. The method of claim 1, wherein selecting the given query suggestion to provide to the user is further based on an overall popularity of the media file.

15. A system including memory and one or more processors operable to execute instructions stored in the memory, wherein the instructions include instructions to:
identify an association of a user to a provided media file, wherein the provided media file is available to the user for consumption;
identify an aspect of the provided media file, wherein the aspect is a specific attribute of the provided media file;
identify a search query entered by the user;
identify a plurality of query suggestions, wherein the query suggestions are based on the search query;
determine, based on identifying the association of the user to the provided media file, a similarity between one or more of the query suggestions and the aspect of the provided media file; and
select one or more of the query suggestions to provide to the user, wherein a given query suggestion of the query suggestions is selected based on the similarity between the given query suggestion and the aspect;
wherein the instructions to select the given query suggestion to provide to the user include instructions to select the given query suggestion further based on a difference between a time interval and a threshold time period, wherein the time interval is based on the time between the user being provided the media file or consuming the media file and the user entering the search query, and wherein the threshold time period is dependent on a type of media of the provided media file.

16. The system of claim 15, wherein the instructions further include instructions to identify a consumption of at least a portion of the provided media file by the user, wherein selecting the given query suggestion to provide to the user is further based on identifying the consumption of at least a portion of the provided media file.

17. The system of claim 15, wherein the instructions further include instructions to: identify a sharing of the provided media file by the user, wherein selecting the given query suggestion to provide to the user is further based on identifying the sharing of the provided media file.

18. The system of claim 15, wherein the instructions further include instructions to:
identify an aspect association source, wherein the aspect association source provides aspects related to one or more aspects; and
identify a second aspect, wherein the second aspect is unique from the aspect of the provided media file, wherein the second aspect is identified based on the aspect association source, and wherein selecting the given query suggestion is further based on the given query suggestion being indicative of the second aspect.

19. The system of claim 15, wherein the instructions further include instructions to:
identify a second user, wherein the second user is in a grouping with the user but has not consumed the provided media file;
identify a second search query entered by the second user;
identify a plurality of second query suggestions, wherein the plurality of second query suggestions are responsive to the second search query; and select one or more of the plurality of second query suggestions to provide to the second user, wherein a likelihood of a given second query suggestion being provided to the second user is determined based at least in part on a similarity between the given second query suggestion and the aspect and is determined based on identifying the association of the user to the provided media file and the second user being in the grouping with the user.

20. The system of claim 19, wherein the provided media file is shared by the user with the second user.

21. A non-transitory computer readable storage medium storing computer instructions executable by a processor to perform a method comprising:
- identifying an association of a user to a provided media file, wherein the provided media file is available to the user for consumption;
- identifying an aspect of the provided media file, wherein the aspect is a specific attribute of the provided media file;
- identifying a search query entered by the user;
- identifying a plurality of query suggestions, wherein the query suggestions are based on the search query;
- determining, based on identifying the association of the user to the provided media file, a similarity between one or more of the query suggestions and the aspect of the provided media file; and
- selecting one or more of the query suggestions to provide to the user, wherein a given query suggestion of the query suggestions is selected based on the similarity between the given query suggestion and the aspect;
- wherein selecting the given query suggestion to provide to the user is further based on a difference between a time interval and a threshold time period, wherein the time interval is based on the time between the user being provided the media file or consuming the media file and the user entering the search query, and wherein the threshold time period is dependent on a type of media of the provided media file.

* * * * *